United States Patent [19]

Kolomeyer

[11] Patent Number: 5,555,844
[45] Date of Patent: Sep. 17, 1996

[54] SCATTER FREE LITTER BOX

[76] Inventor: Norton Kolomeyer, 5694 Greenridge Rd., Castro Valley, Calif. 94552

[21] Appl. No.: 490,025

[22] Filed: Jun. 12, 1995

[51] Int. Cl.⁶ .................................................. A01K 1/035
[52] U.S. Cl. .............................................................. 119/165
[58] Field of Search ..................................... 119/165, 168, 119/169, 170, 496, 497, 482, 61, 72, 73; 220/695, 254

[56] References Cited

U.S. PATENT DOCUMENTS

| | | | |
|---|---|---|---|
| 3,745,975 | 7/1973 | Prucha | 119/165 |
| 3,771,493 | 11/1973 | Chandor | 119/170 |
| 3,831,557 | 8/1974 | Elesh | 119/170 |
| 3,990,396 | 11/1976 | Turk | 119/170 |
| 4,030,448 | 6/1977 | Nuttall | 119/165 |
| 4,646,684 | 3/1987 | Embry | 119/167 |
| 4,766,845 | 8/1988 | Bavas | 119/165 |
| 4,913,091 | 4/1990 | O'Connor | 119/170 |
| 4,926,794 | 5/1990 | Yamamoto | 119/165 |
| 4,932,360 | 6/1990 | O'Connor | 119/168 |
| 5,005,524 | 4/1991 | Berry | 119/73 X |
| 5,125,525 | 6/1992 | Tucker | 220/254 |
| 5,172,652 | 12/1992 | Dorbin et al. | 119/165 |
| 5,174,241 | 12/1992 | Goguen et al. | 119/496 |
| 5,329,878 | 7/1994 | McCauley | 119/165 |

*Primary Examiner*—Robert P. Swiatek
*Assistant Examiner*—Yvonne R. Abbott
*Attorney, Agent, or Firm*—Bielen, Peterson & Lampe

[57] ABSTRACT

A litter box for containing animal litter for household cats, the litter box including a substantially rectangular, deep container and a cover frame for the top of the container, the cover frame having a flat outer rim, an inner lip and an inwardly and downwardly sloping bevel interconnecting the outer rim and inner lip, the inner lip defining a rectangular opening for entry and egress of the cat, the lip having a rounded protective bead, the cover frame being designed to prevent scatter of litter with the concave frame aiding in returning tracked litter to the container.

6 Claims, 1 Drawing Sheet

SCATTER FREE LITTER BOX

BACKGROUND OF THE INVENTION

This invention relates to a cat litter box, and in particular to a deep-container for cat litter in which the container has a removable cover frame with a configuration that inhibits the discharge of cat litter.

The design of a cat litter box requires that the box be a convenient container for cat litter and that the construction of the container appeals to the cat to insure its continued use. It has been discovered that most existing cat litter boxes have a shallow construction into which a thin layer of cat litter is placed. Furthermore, the litter boxes are conventionally constructed of a hard plastic material that is easily cracked and damaged during normal use. Although certain cat litter boxes have proposed the use of a frame-like cover, such cover frames are commonly of convex construction with a central opening that provides some difficulty for a cat entering or leaving the box. Furthermore, a cover frame construction having a convex configuration tends to cause litter that is deposited on the outside of the cover frame during the cat's departure from the box to fall to the floor area around the litter box. Although the use of newspapers and other floor coverings prevent the litter from being further scattered on the floor in the area of the box, such means are generally unsightly and require unnecessary clean-up.

It has been found that when the level of litter in the cat litter box comprises only a thin layer covering the bottom of the container, the cat in covering its eliminated wastes will tend to scatter the litter unnecessarily in an attempt to cover the waste. When a deep layer of litter is contained in the litter box, the depth of the open portion of the container is then insufficient to contain litter scattered by the cat. While deep containers have been proposed for cat litter boxes, the design is such that a top rim is provided which does not encourage return of vagrant litter that is scattered or that is tracked on the rim when the cat departs. Because of the unusual psychological make-up of the common house cat, it is important that the design of a cat litter box appeals to the cat to encourage consistent use. It has been found that certain features not only encourage use, but prevent litter from being scattered outside of the litter box. Furthermore, any litter that is tracked onto the rim of the container, is easily returned to the container by simple brushing with a whisk broom or other similar cleaning device.

SUMMARY OF THE INVENTION

The preferred embodiment of the cat litter box of this invention includes a relatively deep container that has a cover frame with a large central opening for ingress and egress of the cat. The cover has a rim with a recessed opening that encourages entry of the cat into the container of the litter box. Additionally, the opening is designed to provide a narrow horizontal ledge around the perimeter of the opening that provides a lip that retains litter in the box and provides a ledge for any vagrant litter that is tracked from the container when the cat departs the box. Additionally, the ledge allows an foothold for the cat when departing. This presents vagrant litter from finding its way to the floor area around the litter box. By constructing the cover of the litter box with an opening that is of smaller dimension than the dimension of the brim of the container, a degree of privacy in addition to the containing effect of the perimeter is provided. The container is fabricated from a deformable plastic that is both fluid impervious and durable. The opening in the top cover frame is constructed to form a perimeter lip around the opening that is approximately one inch in width. It is noted, that this lip provides both a shield for litter and an added degree of privacy for the animal using the litter box. During use, conventional cat litter is deposited in the container of the litter box to a depth of about four inches. In such manner, approximately five or six inches of side wall remains in the interior of the container to provide for containment of litter scattered during the deposit process of the cat. As it is known, cats tend to cover their wastes and will get into the litter during the covering process. When a shallow deposit of litter is deposited in the container, cats tend to dig to the bottom of the container and scatter litter around and out of the box. By both providing a deep level of litter with high interior retaining walls and a concave cover frame rim, it is virtually impossible for the cat to scatter litter out of the litter box. Furthermore, the concave rim of the cover and the shelf around the opening provide for easy ingress and egress of the cat and convenient return of any vagrant tracked litter to the container. These and other features will become apparent from a detailed consideration of the preferred embodiment.

DETAILED DESCRIPTION OF THE PREFERRED EMBODIMENTS

Figure 1:
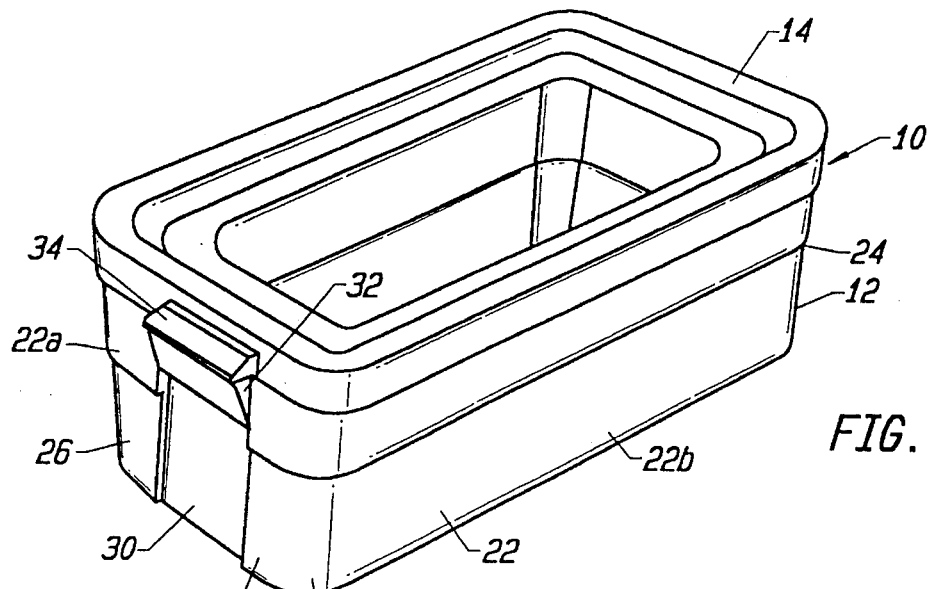
FIG. 1 is a perspective view of the litter box with cover frame retained on the container forming the operational litter box.

Referring to FIG. 1, the litter box is shown in perspective and designated generally by the reference numeral 10. The litter box 10 is constructed with a substantially rectangular container 12 having a cover frame 14 which is shown frictionally secured to the container 12. The litter box 10 is primarily designed and used for household cats and will therefore contain common commercial litter 16 shown in FIG. 3 and in phantom in FIG. 2. The container for the litter box is approximately fifteen inches in width and twenty-one inches in length, and has a depth of approximately nine inches. The size and depth of the litter box is greater than is commonly used for a household litter box and allows litter to be deposited within the box to a depth of approximately four inches. Preferably, the container tapers from a top brim 18 to a bottom 20, which has the ancillary advantage of reducing the quantity of litter to achieve the desired depth. It has been found that litter 16 is less likely to be scatter by a cat using the litter box 10 when the depth of the litter is increased over the conventional shallow depth of litter contained in a shallow litter box or litter tray. Additionally, the larger overall size of the preferred litter box of this invention appears to encourage use by a cat, providing a degree of privacy and comfort during waste elimination. A prototype litter box was constructed from a 10 gallon storage container fabricated by Rubbermaid®.

In the litter box 10 of this invention, the rectangular container 12 has four side walls 22 with an inward step 24 in construction, which provides a convenient level marker for the preferred depth of fill for litter 16. The two opposed side walls 22a at the ends 26 of the litter box 10 are shorter than the two opposed side walls 22b forming the sides of the litter box 10. The litter box 10 has rounded corners 28 which allows convenient cleaning of the interior of the container 12. The side walls 22a at the ends 26 of the litter box have an indent 30 and handles 32 allowing convenient portage of the litter box for disposal of the litter or cleaning.

Figure 2:
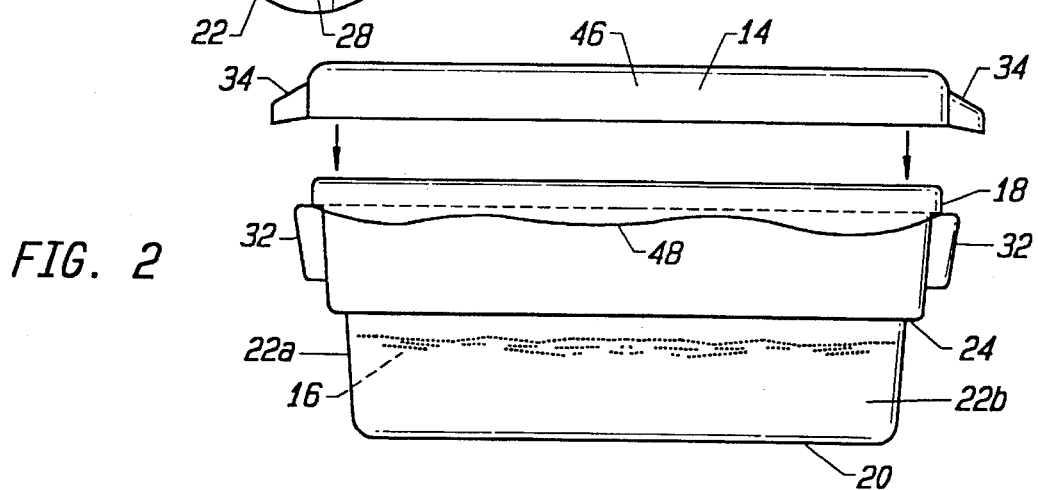
FIG. 2 is a side elevational view with the cover frame elevated from the container of FIG. 1 to show the brim of the container.
Figure 3:
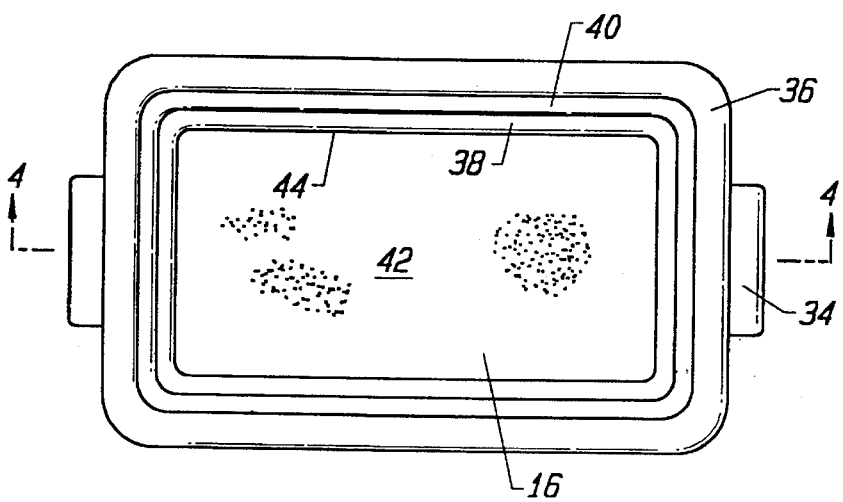
FIG. 3 is a top view of the litter box with the cover frame and container.
Figure 4:
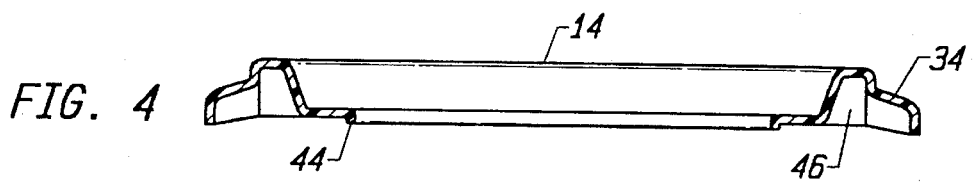
FIG. 4 is a cross sectional view of the cover frame taken on the lines 4—4 in FIG. 3.

Referring in addition to FIGS. 2–4, the cover frame 14 of the litter box 10 has complimentary handles 34 to maintain engagement of the cover frame 14 to the container 12 during portage. Additionally, the handles 34 on the cover frame 14 enable the cover frame 14 to be conveniently removed from the container 12 during disposal and cleaning.

The cover frame 12 has a desirable configuration for inhibiting scatter of litter from the interior of the container and allows for the convenient return of vagrant litter that may be tracked during the cats egress from the litter box. The cover frame 14 has a flat, top, perimeter outer rim 36 and a flat, substantially rectangular inner lip 38 with an intermediate bevel 40. In this manner, the elevation of the lip 38 is lower and closer to the bottom 20 than the rim 32. The flat inner lip 38 forms the circumference of a substantially rectangular opening 42 central to the litter box 10. The edge of the lip 38 is fabricated with a heat formed bead 44 shown in greater detail in the cross sectional view of FIG. 4. The perimeter bead 44 provides a rounded edge for buffering contact of the cat with the cover frame during entry to and egress from the container 12.

Referring to the cross sectional view of FIG. 4, the recessed portion of the cover frame 14 formed by the inner lip 38 and bevel 40 encourage the cat to position in the central area of the interior of the container during waste elimination and provide a shield from scatter of litter during the process of the cat covering the waste material with its paw. Furthermore, the inner lip 38 provides a placement ledge for the cat during egress such that any vagrant litter on the cats paws is deposited on the rim during egress and can be conveniently brushed back into the container. The rim, lip, and bevel are each approximately one inch in width in order that the central rectangular opening be maximized. As shown, the cover frame 14 and container 12 are contoured in form and the outer rim 36 melds into a perpendicular perimeter band 46 which engages the downwardly turned brim 18 of the container 12 providing a secure frictional engagement of the cover frame 14 and the container 12. The container 12 and cover frame 14 are fabricated from a flexible polymer durability. The litter box 10 can be used with or without a liner 48 which is shown as a clear plastic draped over the top brim 18 of the container in FIG. 2. It is to be understood that the liner 48 conforms to the interior of the container and may be disgarded with contained litter as necessary.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A litter box for containing animal litter for household cats, the litter box comprising:

a substantially rectangular container, having a bottom with four side walls and rounded corners interconnecting the sidewalls, wherein the interconnected sidewalls form an open top with a perimeter brim; and, a removable cover frame with a substantially rectangular, central opening with an inner flat lip, an outer flat rim and an intermediate incline bevel between the inner lip and the outer rim, wherein the outer flat rim has an outer edge with a perimeter band perpendicular to the flat rim, the flat rim seating on the brim of the container with the perimeter band engaging the brim to retain the cover frame on the container during use, the incline bevel being directed inward and downward from the flat rim to the flat lip, wherein the flat rim and flat lip are substantially parallel with the bottom of the container with the outer rim higher than the inner lip when the cover frame is retained on the container.

2. The litter box of claim 1 wherein two of the sides forming the substantially rectangular container are shorter than the remaining two sides and the container has a depth wherein the shorter sides have a length and the depth of the container is approximately two thirds the length of the shorter sides of the container.

3. The litter box of claim 2 wherein the depth of the container is approximately nine inches, and, the flat outer rim, the inner lip and the intermediate bevel each have a width and are each at least one inch in width.

4. The litter box of claim 2 wherein the shorter sides of the substantially rectangular container each have a handle for transporting the litter box.

5. The litter box of claim 1 wherein the inner lip has an inner edge in the form of a rounded bead.

6. The litter box of claim 1 wherein the cover from and container are fabricated from a deformable polymer.

* * * * *